US007003513B2

(12) United States Patent
Geiselhart

(10) Patent No.: US 7,003,513 B2
(45) Date of Patent: Feb. 21, 2006

(54) METHOD AND SYSTEM OF WEIGHTED CONTEXT FEEDBACK FOR RESULT IMPROVEMENT IN INFORMATION RETRIEVAL

(75) Inventor: Reinhold Geiselhart, Rottenburg-Ergenzingen (DE)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 09/855,863

(22) Filed: May 14, 2001

(65) Prior Publication Data

US 2002/0069190 A1 Jun. 6, 2002

(30) Foreign Application Priority Data

Jul. 4, 2000 (DE) ................ 001 14 341

(51) Int. Cl.
G06F 17/30 (2006.01)
(52) U.S. Cl. ............................. 707/5; 707/4
(58) Field of Classification Search .............. 707/1–5, 707/6; 704/1–10
See application file for complete search history.

(56) References Cited

U.S. PATENT DOCUMENTS

| | | | | | |
|---|---|---|---|---|---|
| 5,675,819 | A | * | 10/1997 | Schuetze ................. | 704/10 |
| 5,696,962 | A | * | 12/1997 | Kupiec .................... | 707/4 |
| 5,724,567 | A | * | 3/1998 | Rose et al. .............. | 707/2 |
| 5,778,362 | A | | 7/1998 | Deerwester | |
| 5,933,822 | A | * | 8/1999 | Braden-Harder et al. .... | 707/5 |
| 6,014,664 | A | * | 1/2000 | Fagin et al. ............. | 707/5 |
| 6,094,648 | A | * | 7/2000 | Aalbersberg ............. | 707/3 |
| 6,401,118 | B1 | * | 6/2002 | Thomas ................... | 709/224 |
| 6,473,751 | B1 | * | 10/2002 | Nikolovska et al. ....... | 707/3 |
| 6,493,702 | B1 | * | 12/2002 | Adar et al. .............. | 707/3 |
| 6,510,406 | B1 | * | 1/2003 | Marchisio ................ | 704/9 |
| 6,519,586 | B1 | * | 2/2003 | Anick et al. ............. | 707/3 |
| 6,636,848 | B1 | * | 10/2003 | Aridor et al. ............ | 707/3 |
| 6,714,929 | B1 | * | 3/2004 | Micaelian et al. ........ | 707/4 |
| 6,792,419 | B1 | * | 9/2004 | Raghavan ................. | 707/3 |
| 2002/0055940 | A1 | * | 5/2002 | Elkan .................. | 707/104.1 |
| 2002/0103798 | A1 | * | 8/2002 | Abrol et al. ............ | 707/5 |
| 2002/0123994 | A1 | * | 9/2002 | Schabes et al. .......... | 707/5 |
| 2002/0156763 | A1 | * | 10/2002 | Marchisio ............... | 707/1 |

OTHER PUBLICATIONS

Ronald Fagin and Edward L. Wimmers. "Incorporating User Preferences in Multimedia Queries" In Foto Afrati and Phokion Kolaitis, editors *Proceedings of Database Theory ICDT '97, 6th International Conference*, Delphi, Greece, pp. 247-261, Jan. 1997.

(Continued)

*Primary Examiner*—Mohammad Ali
*Assistant Examiner*—Kuen S. Lu
(74) *Attorney, Agent, or Firm*—Kunzler & Associates

(57) ABSTRACT

A method and a system for re-ranking an existing result set of documents. A user starts a search by entering search term(s). The search term(s) is (are) transferred to a search engine which generates a result set ranked by the search term(s). The search engine, in parallel, automatically retrieves context information from returned result set which is related to the original set of documents. The search engine presents the context information to the user and asks for a feedback. The user performs a weighting of the presented context information in a range from "important" to "non-important". The result set is then re-ranked with the user-weighted context information to increase the "rank distance" of important and non important documents. The documents that are on top of the list (highest context-weighted ranking value) represent the desired information.

12 Claims, 3 Drawing Sheets

OTHER PUBLICATIONS

Ronald Fagin and Yoëlle S. Maarek; "Allowing Users to Weight Search Terms" In *Proc. RIAO (Recherche D'Informations Assistee par Ordinateur=Computer Assisted Information Retrieval)* '2000, pp 682-700.

Ronald Fagin and Eward L. Wimmers. "A Formula for Incorporating Weights into Scoring Rules", *Theoretical Computer Science* 239 (2000), pp. 309-338.

"Method For Inferring Lexical Associations From Textual Co-Occurrences", IBM Technical Disclosure Bulletin, vol. 33 Nr. 1B pp. 54-55.

Ronald Fagin and Edward L. Wimmers, "Incorporating User Preferences in Multimedia Queries", Proceedings of the International Conference. Proceedings, Proceeding Database Theory, vol. 1186, pp. 247-261.

Ronald Fagin and Edward L. Wimmers, "A Formula For Incorporating Weights Into Scoring Rules", Database Theory—ICDT '97. 6th International Conference, Delphi, Greece, Jan. 8-10, 1997, Theoretical Computer Science, May 28, 2000, Elsevier, Netherlands, pp. 309-338.

Yoelle S. Maarek et al., "Full Text Indexing Based On Lexical Relations An Application: Software Libraries", Proceedings of the International Conference on Research and Development in Information Retrieval. Cambridge MA., Jun. 25-28, 1989, Rading, ACM, US, vol. 12 pp. 198-206.

James W. Cooper and Roy J. Byrd, "Lexical Naviagation: Visually Prompted Query Expansion and Refinement", Proceedings of the second Acm International Conference on Digital Libraries, Online 1997, pp. 237-246, http://delivery.acm.org/10.1145/270000/263828/p237.

Gerard Salton and Chris Buckley, "Improving Retrieval Performance by Relevance Feedback", Journal of the American Society for Information Science, American Society for Information. Washington, US, vol. 41, NR 4, pp. 288-297.

Ronal Fagin and Yoelle S. Maarek, "Allowing Users to Weight Search Terms", Proceedings of RIAO 2000, Online Apr. 12, 2000, www.almaden.ibm.com/cs/people/fagin/riao00.pdf.

* cited by examiner

| Importance | Context |
|---|---|
| | beam,electron |
| | beam,ray |
| | film,measure |
| | data,display |

Rank new

| # | Rank | Document ID | Collection | Size |
|---|---|---|---|---|
| 1 | 40 | pat24268.txt | SCIENCE | 313 |
| 2 | 39 | pat24266.txt | SCIENCE | 273 |
| 3 | 34 | pat24314.txt | SCIENCE | 187 |
| 4 | 32 | pat25049.txt | SCIENCE | 320 |
| 5 | 32 | pat24323.txt | SCIENCE | 216 |
| 6 | 30 | pat24535.txt | SCIENCE | 262 |
| 7 | 30 | pat24264.txt | SCIENCE | 318 |

FIGURE 2

METHOD AND SYSTEM OF WEIGHTED CONTEXT FEEDBACK FOR RESULT IMPROVEMENT IN INFORMATION RETRIEVAL

CLAIM OF PRIORITY

This application claims the foreign priority benefits under 35 U.S.C. §119 of European application No. 00114341.1 filed on Jul. 4, 2000, which is incorporated herein by reference.

BACKGROUND OF THE INVENTION

1. Field of the Invention

The present invention relates in general to the field of document based information retrieval in the intranet and the internet domain, and in particular to a method and system for re-ranking an existing ranked result set of documents.

2. Description of Related Art

Nowadays digital information systems provide easy access to large amounts of information. For example, users can access great quantities of information in databases on a network or even in personal computers. Mere access to large amounts of information has only limited value, however, without knowing what is useful about the information.

Searching for a certain information in a huge amount of almost unstructured information can be a very cumbersome task. Although the probability is relatively high that the desired information is somewhere existent in an existing collection of information and potentially can be found, it is at the same time covered up with all that additional unwanted information.

To retrieve a desired piece of information, there have been proposed several methods. A first approach is to structure raw data before a search is started. Structuring the raw data in advance can be done by introducing a set of taxonomies (like "cars", "health", "computers" etc.) and assigning each retrieved document into one or more of those categories. This can be performed in advance, e.g. by an administrator.

Before a search is started, the user has to preselect one or more categories and thereby reduce the possible amount of returned information. Only the information stored in the selected categories is returned. A simple way to accomplish this is for example having several different indexes for the search engine. The user can then select either one or more indexes as a basis for the search.

The drawback of the above described approach is that extra effort is necessary for preparing the raw data by defining the taxonomy set and by assigning each document into one or more categories (or indexes). Since the information most often is of a dynamic nature, an update of new information or categories (or both) has to be done on a regular basis. Further, there is a certain chance that some information is lost because of a wrong assignment to categories or a missing selection by the user.

A second approach is to structure a search result after having finished the search. Structuring the result of a search is either based on the input the user made when he started the search with some query terms, or an attempt is made to dynamically find similiarities inside of the documents and group (cluster) them together.

The second approach can be implemented by way of clustering the results which means finding "categories" dynamically by looking for similiarities inside of the returned documents. This can be achieved according to several different criteria, for example by scanning for lexical affinities (anyhow related expressions) and bundling those documents that have a certain similarity. Thereby the total set of returned documents is split into several non-overlapping clusters that contain documents which are assumed to deal with the same or similiar context.

The drawback of the above second approach is that the search engine has no idea which context the user is really looking for. Moreover, the clustering of the documents is performed on the basis of word tuples (a set of search terms) that occur with a certain relation to each other in the documents. Ambiguous terms can cause some documents to be scattered all over the clusters, although from the user point of view they deal with the same context. To find those documents the user has to open and read lots of uninteresting information.

An alternative way to implement the second approach, i.e. structurung the search result after having finished the search, is to sort the returned documents in a descending order, derived by some comparable criterion. This method is commonly known as "Ranking". The appearance of the search terms in each of the documents is a measurement for the importance of the individual document. All values are normalized so the higher the rank value is, the more importance is assumed.

Various different algorithms are used to determine the individual rank value, most often the document sizes, the index sizes, the total number of returned information or other criteria are considered.

Still another way to implement the second approach is refining the search by adding more precise search terms known as "Narrow Query". The user starts the search process with an initial query and examines some of the returned documents. For each document he assigns a relevance value that reflects if the appropriate document is of high or low value. The search engine scans the marked documents for terms that occur with a high frequency and uses those terms to synthesize a new query. This new query favors the high frequent terms of the documents with a high relevance and excludes the terms of the documents with a low relevance.

But its drawback is that for good results the user has to examine and mark a lot of documents, otherwise the refined query is more or less random.

The predescribed approaches have common drawback that only the entered search terms can be taken into account. Since search terms often are ambiguous, they can occur in various totally different context and cause a lot of unwanted information to be returned. If, in addition, there are only a few terms entered, there is a high probability that lots of documents get the same high rank value.

Further, in an article by R. Fagin and E. L. Wimmers entitled "Incorporating user preferences in multimedia queries", and published in Proc. 1997 International Conference on Database Theory, pp. 247–261, according to a third approach, it is proposed to weight the search terms in information retrieval with the help of user feedback and to allow to apply weights to any sort of rules. In particular, a formula is described to re-sort and re-rank the result set of a query according to the weighting of the original search terms by the user.

The drawback of the above third approach is that from common experiences in information retrieval, it is known that the typical query consists of very few search terms (1 or 2 terms). In the wast majority of all searches trying to apply any weighting to the search terms would have very little impact. The main reason for the fact that the average search is made with only one or two terms is that the user lacks the conception of what additional context information he needs to enter in order to improve the query and filter the unwanted documents. Following this scenario, the user would have to read some of the returned documents first to obtain some context information which he in turn could then use to create additional query terms. Only with a minimum set of query terms that reflect the desired context, this method would make sense.

Finally, all of the above cited prior art approaches have common drawback that, if the preparation of the raw data as described above is not feasible or in a situation, where information can be lost because of a user error, e.g. by selecting a wrong index, only a method that does a post search improvement is acceptable.

Thereupon, all of the described approaches require a relatively high effort with opening and reading the contents of documents, thereby wasting time with useless information.

SUMMARY OF THE INVENTION

An object of the present invention therefore is to provide an information retrieval method and system which presents only the desired information without wasting a user's time with opening and reading documents of no value.

Another object is to provide a method and a system for ranking information comprised of a set of documents which presents the desired information on top of a ranking hierarchy.

Still another object is to minimize the possibility of user errors, in particular with respect to generating search queries.

The present invention accomplishes the foregoing objectives by gathering context information from the documents, generating at least one rank criterion from the context information and re-ranking the documents, based on the at least one rank criterion.

The concept underlying the present invention is a post search improvement, particularly a human feedback to improve search results. It is emphasized hereby that the proposed re-ranking is only based on the results of a first search procedure.

The criterion for re-ranking hereby consists of terms themselves found in the documents. These terms contain information which can provide feedback to the context of the underlying documents. These terms, designated as "context terms" in the following, are used in a weighting formula in order to separate documents with a matching context from documents with a dismatching context.

The ambiguity of search terms which causes unwanted information to be returned, in a preferred embodiment, is solved by means of context information which is used to filter documents with unwanted context. In another embodiment, a context weighting can be performed on a client data processing system, wherein no iterative and time consuming access to a search engine is necessary.

Using lexical affinities to be evaluated as a criterion for re-ranking, is only exemplary and can be accomplished also by other means that are able to provide a notion of context. A suitable approach could be to use "features" that have been extracted from the documents or to simply create "word statistics". "Features" are names of people, places, companies etc. and can be presented as a context indication very similar to lexical affinities. Especially when several extracted features are grouped and weighted together, the context definition would be very precise. "Word statistics" describe the frequency a given word is occuring within a given document.

In case one finds several different words in a document at least a minimum amount of times—no matter if they occur with a certain proximity to each other like with lexical affinities—and the same is true for another document, it is assumed that both documents are very close to each other concerning their context.

Both information (features as well as word statistics) can also be created by the search engine and transferred to the client together with the result set.

Advantageously, the number of unnecessarily opened documents is hereby essentially reduced since an appropriate weighting of the context terms allows to precise the right context for the desired information.

BRIEF DESCRIPTION OF THE DRAWINGS

The present invention will be understood more readily from the following detailed description when taken in conjunction with the accompanying drawings, in which:

FIG. 2 is a screenshot of a possible implementation of the method according to the present invention.

DETAILED DESCRIPTION OF THE INVENTION

Figure 1:
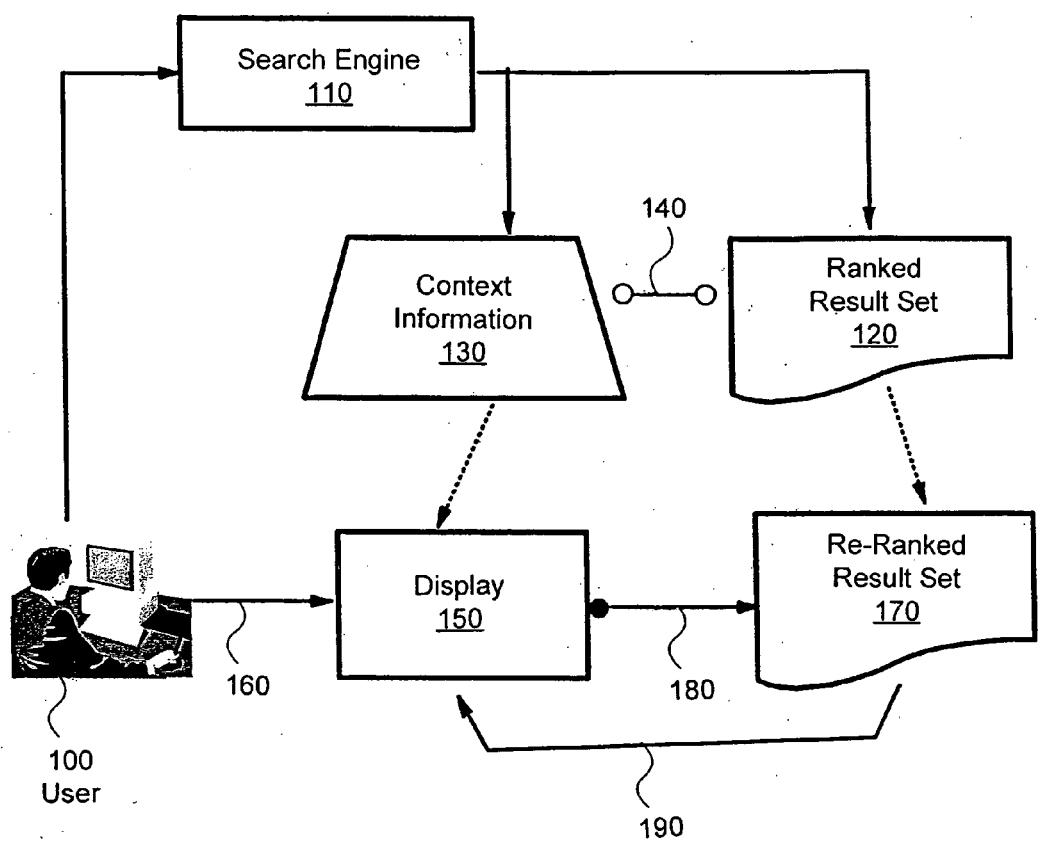
FIG. 1 is a combined block and flow diagram depicting a search process with weighted context feedback by lexical affinities, in accordance with the present invention.

Referring to FIG. 1, a combined block and flow diagram is depicted which shows a typical search with weighted context feedback by lexical affinities. The scenario described in the following assumes that it is accepted to start a search with rather unprecise search terms and to try to structure the huge amount of returned data according to context information.

A user 100 starts a search by entering search term(s). The search term(s) is (are) transferred to a search engine 110 which generates a result set 120 ranked by the search term(s). The search engine 110, in parallel, automatically retrieves context information 130 from returned result set 120 which is related 140 to the original set of documents. The context information, in a preferred embodiment, is based on lexical affinities which will be discussed in more detail later.

The search engine 110 presents (displays) 150 the context information 130 to the user 100 and asks for a feedback. The user 100 performs a weighting 160 of the presented context information 130 in a range from "important" to "non-important".

The result set 120 is then re-ranked 170 with the user-weighted context information 180 to increase the "rank distance" of important and non-important documents. The re-ranking is performed by utilizing a context ranking formula which is described in more detail below. The documents that are now on top of the list (highest context-weighted ranking value) represent the desired information.

Optionally, the re-ranking can be performed iteratively wherein the ranked set of documents ranked by the user-weighted context information 180 is treated as a new set 190 with different weightings, based on the original set, and re-ranked again performing the predescribed steps.

The underlying re-ranking algorithm is based on an adaptation of the prementioned Fagin's and Wimmers' formula. The way to generate context information is the extraction of "lexical affinities". This method produces pairs of terms that are found in a certain relation within the documents. If one, for example, is searching for the term "display", that term could occur together with the terms "window" or "show" or "computer" or various other combinations. Each combination is an indication for the context the documents are dealing with.

In the formula of R. Fagin and E. L. Wimmers, the following definitions are assumed:

Let x1, ..., xm be the terms that represent the context information. The function f(x1, ..., xm) is then the ranking function that returns a rank value for a given document with respect to the terms x1, ..., xm. $\theta$=($\theta$1, ..., $\theta$m) is the overall weighting for all of the m terms and $\theta$i is the individual weight for term xi. Under the assumption that $\theta$1, ..., $\theta$m are all non-negative, $\theta$1>= ... >=$\theta$m and they all sum to one, we use the weighted ranking formula according to Fagin and Wimmers which is:

$$(\theta 1 - \theta 2) f(x1) + 2(\theta 2 - \theta 3) f(x1, x2) + 3(\theta 3 - \theta 4) f(x1, x2, x3) + \ldots + m \theta m f(x1, \ldots, xm) \quad (1)$$

A scenario where all m context terms get a different rating would increase the necessary calculating effort to the theoretical maximum of m. According to equation (1) we had to calculate the ranking value for each document m times, i.e.

f(x1), f(x1, x2), f(x1, x2, x3), ..., f(x1, ..., xm), since the expressions ($\theta$n−$\theta$n+1) in equation (1) would all become non-equal to zero.

Besides the enormous visualization effort to allow a user to choose m different ratings for all the m context terms, it seems very unlikely that anybody would really do this. An approach where, for example, three different rating levels are selectable is much more practical.

Let the rating levels be "high", "medium" and "low" and the relation between those three rating levels be:

$$\theta a = 2 \theta b \text{ and } \theta c = 0.5 \theta b \quad (2).$$

During further evaluation with more samples of test documents it might turn out that a stronger spreading of those three levels is more appropriate, such as $\theta a=4 \theta b$ and $\theta c=0.25 \theta b$ or even more.

Now the rating selections of all of the context terms made by the user can be divided into:

a terms rated with "high"

b terms rated with "medium"

c terms rated with "low"  (3)

where all selections sum up to the total number of context terms:

$$a+b+c=m \quad (4).$$

Because of the assumption that all $\theta$1, ..., $\theta$m are non-negative and sum to one, it can be written $a \theta a + b \theta b + c \theta c = 1$ and $\theta b = (1 - a \theta a - c \theta c)/b.$ Because of equation (2) it follows $\theta b = (1 - 2a \theta b - 0.5c \theta b)/b$ and finally $$\theta b \cdot 1 = (2a + b + 0.5c) \quad (5).$$

Allowing only three discrete ranking levels, one gets only three groups of $\theta$n sorted according to their importance to the user. The first "a" context terms are rated high, the next "b" context terms are rated medium and the last "c" context terms are rated low.

$\theta 1 = \ldots \theta a$ and $\theta a+1 = \ldots \theta a+b$ and $\theta a+b+1 = \ldots = 74 \, m \quad (6).$ Using equation (6), equation (1) can be simplified into:

$$a(\theta a - \theta a + 1) f(x1, x2, \ldots, xa) + \quad (7)$$
$$(a+b)(\theta a + b - \theta a + b + 1) f(x1, x2, \ldots, xa+b) +$$
$$(a+b+c)\theta c \, f(x1, x2, \ldots, xa+b+c).$$

In case of the only three relevance values "a", "b", and "c", $\theta a+1=\theta b$, $\theta a+b=\theta b$ and $\theta a+b+1=\theta c$, one can substitute $$a(\theta a - \theta b) f(x1, x2, \ldots, xa) + (a+b)(\theta b - \theta c) f(x1, x2, \ldots, xa+b) + \quad (8)$$
$$(a+b+c)\theta c \, f(x1, x2, \ldots, xa+b+c).$$

This has to be converted into a normalized form with only dependencies to the number of context terms rated with the three discrete ranking levels and the rank functions of the appropriate context terms.

Following equation (2) one can substitute equation (8) with:

$$a \, \theta b \, f(x1, \ldots, xa) + 0.5(a+b)\theta b \, f(x1, \ldots, xa+b) + \quad (9)$$
$$0.5(a+b+c)\theta b \, f(x1, \ldots, xa+b+c)$$

and according to equation (5) one finally obtains:

$$[2a \, f(x1, \ldots, xa) + (a+b) f(x1, \ldots, xa+b) + \quad (10)$$
$$(a+b+c) f(x1, \ldots, xa+b+c)] / (4a + 2b + c).$$

Equation (10) calculates the relevance of a document with respect to the context terms x1, ..., xm when a, b and c are the number of terms that have been assigned a high (a), medium (b) and low (c) relevance and f(x1, ..., xa), f(x1, ..., xa+b) and f(x1, ..., xa+b+c) are the partial relevance functions of this document with respect to a subset of context terms.

In comparison to equation (1), one now has to call the ranking function only three times with different parameter lists which saves a considerable amount of processing effort. The additional factors in equation (10) are necessary to fulfill the three desiderata of equation (1). For the further details concerning these factors it is referred to the prementioned article by Fagin and Wimmer.

A first way is to feed back the weighting information to the Text Search Engine and calculate the new rank value for all documents of the result set. This reveales some major problems as it is currently not possible to call a ranking function with new parameters (the context terms) on the basis of a prior search, because the statistics of these new parameters are not available. Only the original search terms, that are known during the search process, are complemented by the statistics information of the search indexes and could then be used for a ranking.

Besides this problem, it would also require some additional communication with the search engine that increases the response time to the user.

Therefore, it is proposed that a new and very efficient ranking algorithm to be used solely on the client side without any further access to the Text Search Engine. The processing effort is relatively low, so that it can also be used on so called "thin clients" and a quick response to the user is guaranteed.

The new ranking algorithm is based on the "absolute" ranking of the prior search that was derived from the query terms only. Depending on the occurrence of the context terms in a given document and their importance for the user a new rank value is calculated:

Let Rd be the "absolute" rank value of a given document "d" that resulted from the search, Td =(x1, . . . , xn) is the tuple of context terms that are contained in document "d", then is $$fd(x1, \ldots, xn) = Rd \text{ if } x1, \ldots, xn \text{ element of } Td$$

and $$fd(x1, \ldots, xn) = 0 \text{ if } x1, \ldots, xn \text{ non-element of } Td \qquad (11).$$

This new ranking equation (11) is used together with the adaptation of Fagin's and Wimmer's weighted ranking equation (10) and results in a new rank value for each document. The desired effect is a change in the result set order. Those documents that contain the preferred context terms will appear on top of the list since their new rank value is higher than before. The documents that contain only the context terms that got a low relevance from the user will be pushed to the end of the list since their rank value is lowered.

The above described (re-)ranking algorithm can be implemented in a Java environment with the help of Visual Builders. For the special purpose of weighted context feedback a new Java Bean was developed and seemlessly integrated into the Java Beans component model architecture.

FIG. 2 depicts a screenshot of a possible implementation of this method. The right side of this screenshot shows the result of a search in a table format. According to the ranking of the result set by the query term (in this case it was the single word "display"), the documents are sorted top-down.

On the left side there is the visualization of the Context Feedback. The left column with the header title "Importance" holds three graphical buttons on each line, the right column with the header title "Context" holds the pairs of lexical affinities on each line. The table is scrollable upward and downward to display all the context information and the corresponding weighting.

Immediately after having performed a search, the right column is filled with all context information that could be extracted from all documents of the result set, the weighting of the individual context information in the left column is all set to medium.

By clicking the plus or minus symbols the weighting for each pair of lexical affinities can be modified. Leaving some entries in the "medium" state is also possible. As soon as the user is done with the weighting, he presses the "Rank new" button and the information is sent to the search client to do a weighted re-rank. This causes the right result set table to refresh its contents with the new ranking order.

Figure 3:
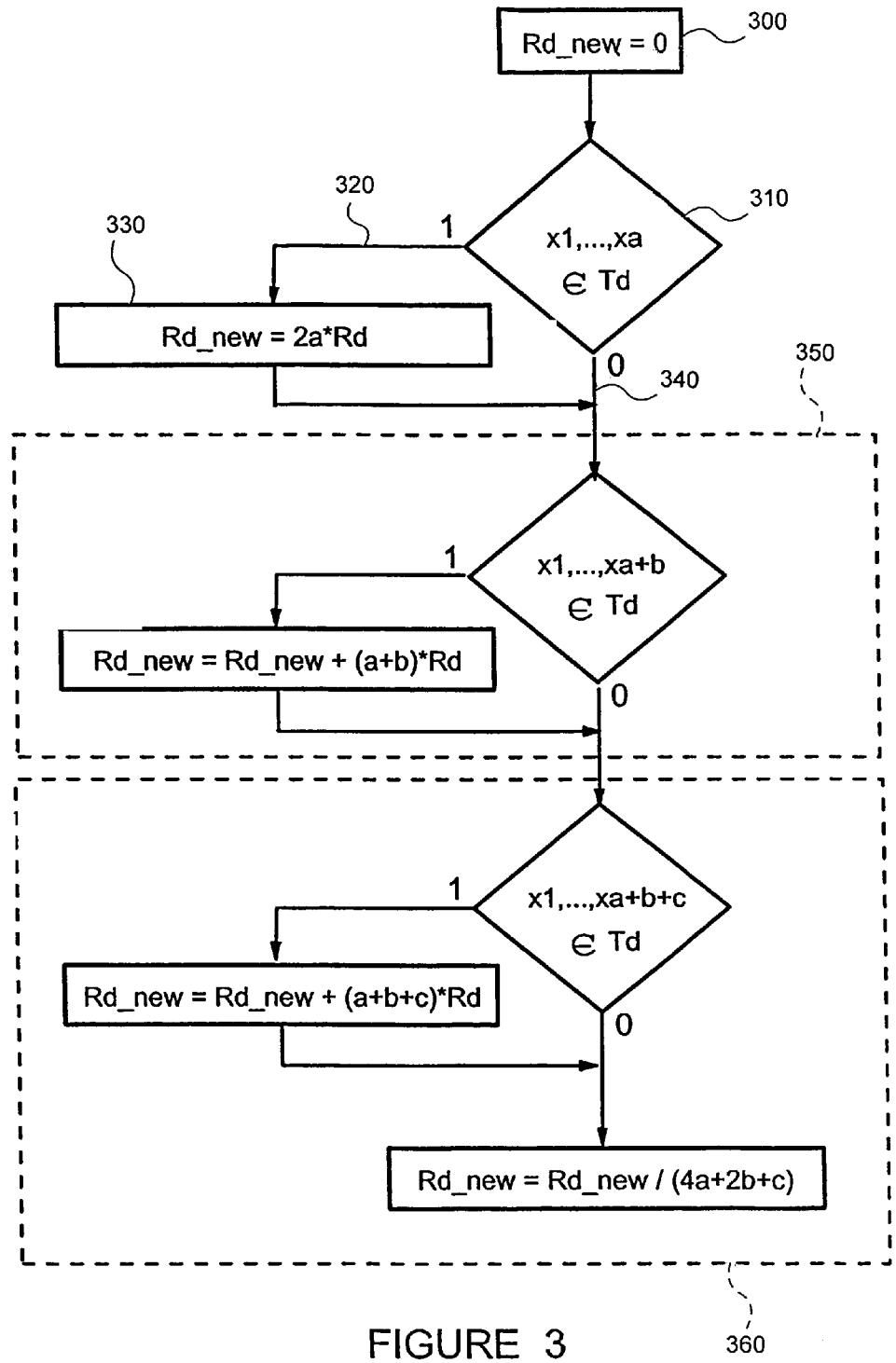
FIG. 3 is a flow diagram depicting an embodiment of the re-ranking mechanism proposed by the present invention.

FIG. 3 shows the mechanism that leads to a new ranking value "Rd_new" for each document "d" contained in a result set. As already mentioned, the number of iterations per individual document depends on the number of discrete ranking levels that are offered to the user. Following the example depicted in FIG. 2 with three different ratings ("high", "medium" and "low") one has to calculate up to three portions per document that make up the new rank value. For each document it is started with its "absolute" rank value of the unweighted result set "Rd" and set the initial value of "Rd_new" equal to "0", in step 300. Further, it is checked in step 310 whether any of the lexical affinities that have been weighted "high" are contained in document "d". If true 320, the new ranking value "Rd_new" is set to "2a*Rd" in step 330 ("a" is the number of lexical affinities weighted with "high"), otherwise "Rd new" remains unchanged 340.

In a next iteration 350 one performs a similar calculation for all the lexical affinities that have been rated "high" and "medium", and finally a third iteration 360 takes into account all the "high", "medium" and "low" rated lexical affinities. The last step is a normalization of the new rank value "Rd_new".

It is noted hereby that the above described mechanism for re-ranking documents can be applied to any text documents or non-text documents, i.e. all kinds of documents where a ranking principally can be performed. The term "document" as used herein, should be understood in its broadest sense and means an arbitrary allied amount of information contained in files (as per the Windows operating system usage), documents (as per the MacOS operating system usage), pages (as per the web phraseology usage), and other records, entries or terminology used to describe a unit of a data base, a unit of a file system or a unit of another data collection type, whether or not such units are related or relational.

The invention claimed is:

1. A computer implemented method for re-ranking a set of ranked documents, each ranked document having an absolute ranking value determined based on one or more search terms, the method comprising:
    retrieving a plurality of context information based on said one or more search terms from each of said set of ranked documents;
    presenting said plurality of context information together with a set of associated ranking criteria to a user, said set of associated ranking criteria being based on discrete ranking levels;
    receiving user preferences regarding each of said ranking criteria associated with each of said plurality of context information; and
    re-ranking said set of ranked documents based on a new ranking value calculated for each of said ranked documents utilizing a context ranking formula based on said absolute ranking value and said user preferences regarding each of said associated ranking criteria.

2. The computer implemented method of claim 1, wherein retrieving a plurality of context information comprises one or more of extracting lexical affinities, extracting features, and extracting word frequency statistics from said set of ranked documents.

3. The computer implemented method of claim 1, wherein user preferences of said associated ranking criteria are based on a weighting function.

4. The computer implemented method of claim 1, wherein said context ranking formula utilizes the following ranking and weighted ranking equations:

ranking equation $$fd(x1, \ldots, xn) = Rd \text{ if } x1, \ldots, xn \text{ are elements of } Td,$$
and
$$fd(x1, \ldots, xn) = 0 \text{ if } x1, \ldots, xn \text{ are not elements of } Td,$$

wherein Rd is the absolute ranking value of a document "d" that results from a search, and Td=(x1, ..., xn) is a tuple of context terms that are contained in the document "d";

weighted ranking equation $$[2a\ f(x1, \ldots, xa) + (a+b)\ f(x1, \ldots, xa+b) + (a+b+c)\ f(x1, \ldots, xa+b+c)]/(4a+2b+c)$$

wherein the weighted ranking equation calculates the relevance of a document with respect to the context terms x1, ..., xm when a, b and c are the number of terms that have been assigned a high (a), medium (b) and low (c) relevance and f(x1, ..., xa), f(x1, ..., xa+b) and f(x1, ..., xa+b+c) are partial relevance functions of the document with respect to a subset of the context terms.

5. A computer program product comprising a computer useable medium having a computer readable program for re-ranking a set of ranked documents, each ranked document having an absolute ranking value determined based on one or more search terms, said computer readable program when executed on a computer causes the computer to:

retrieve a plurality of context information based on said one or more search terms from each of said set of ranked documents;

present said plurality of context information together with a set of associated ranking criteria to a user, said set of associated ranking criteria being based on discrete ranking levels;

receive user preferences regarding each of said ranking criteria associated with each of said plurality of context information; and re-rank said set of ranked documents based on a new ranking value calculated for each of said ranked documents utilizing a context ranking formula based on said absolute ranking value and said user preferences regarding each of said associated ranking criteria.

6. The computer program product of claim 5, wherein an operation to retrieve a plurality of context information comprises one or more of extracting lexical affinities, extracting features, and extracting word frequency statistics from said set of ranked documents.

7. The computer program product of claim 5, wherein user preferences of said associated ranking criteria are based on a weighting function.

8. The computer program product of claim 5, wherein said context ranking formula utilizes the following ranking and weighted ranking equations:

ranking equation $$fd(x1, \ldots, xn) = Rd \text{ if } x1, \ldots, xn \text{ are elements of } Td,$$
and
$$fd(x1, \ldots, xn) = 0 \text{ if } x1, \ldots, xn \text{ are not elements of } Td,$$

wherein Rd is the absolute ranking value of a document "d" that results from a search, and Td=(x1, ..., xn) is a tuple of context terms that are contained in the document "d";

weighted ranking equation $$[2a\ f(x1, \ldots, xa) + (a+b)\ f(x1, \ldots, xa+b) + (a+b+c)\ f(x1, \ldots, xa+b+c)]/(4a+2b+c)$$

wherein the weighted ranking equation calculates the relevance of a document with respect to the context terms x1, ..., xm when a, b and c are the number of terms that have been assigned a high (a), medium (b) and low (c) relevance and f(x1, ..., xa), f(x1, ..., xa+b) and f(x1, ..., xa+b+c) are partial relevance functions of the document with respect to a subset of the context terms.

9. An apparatus for re-ranking a set of ranked documents, each ranked document having an absolute ranking value determined based on one or more search terms, the apparatus comprising, a search engine which:

retrieves a plurality of context information based on said one or more search terms from each of said set of ranked documents;

presents said plurality of context information together with a set of associated ranking criteria to a user, said set of associated ranking criteria being based on discrete ranking levels;

receives user preferences regarding each of said ranking criteria associated with each of said plurality of context information; and re-ranks said set of ranked documents based on a new ranking value calculated for each of said ranked documents utilizing a context ranking formula based on said absolute ranking value and said user preferences regarding each of said associated ranking criteria.

10. The apparatus of claim 9, wherein the retrieve module is configured to perform operations to retrieve a plurality of context information, the operations comprising one or more of extracting lexical affinities, extracting features, and extracting word frequency statistics from said set of ranked documents.

11. The apparatus of claim 9, wherein user preferences of said associated ranking criteria are based on a weighting function.

12. The apparatus of claim 9, wherein said context ranking formula utilizes the following ranking and weighted ranking equations:

ranking equation $$fd(x1, \ldots, xn) = Rd \text{ if } x1, \ldots, xn \text{ are elements of } Td,$$
and
$$fd(x1, \ldots, xn) = 0 \text{ if } x1, \ldots, xn \text{ are not elements of } Td,$$

wherein Rd is the absolute ranking value of a document "d" that results from a search, and Td=(x1, ..., xn) is a tuple of context terms that are contained in the document "d";

weighted ranking equation $$[2a\ f(x1, \ldots, xa) + (a+b)\ f(x1, \ldots, xa+b) + (a+b+c)\ f(x1, \ldots, xa+b+c)]/(4a+2b+c)$$

wherein the weighted ranking equation calculates the relevance of a document with respect to the context terms x1, ..., xm when a, b and c are the number of terms that have been assigned a high (a), medium (b) and low (c) relevance and f(x1, ..., xa), f(x1, ..., xa+b) and f(x1, ..., xa+b+c) are partial relevance functions of the document with respect to a subset of the context terms.

* * * * *